United States Patent Office
3,402,163
Patented Sept. 17, 1968

3,402,163
PRODUCTION OF MIXTURES OF HIGH MOLECULAR WEIGHT 1,4-HOMO-CIS- AND 1,4-HOMO-TRANS-POLYBUTADIENES
Bernhard Schleimer and Heinrich Weber, Marl, Germany, assignors to Chemische Werke Huls, A.G., Marl, Germany
No Drawing. Filed Apr. 30, 1965, Ser. No. 452,340
Claims priority, application Germany, Apr. 30, 1964, C 32,767
7 Claims. (Cl. 260—94.3)

ABSTRACT OF THE DISCLOSURE

A method of simultaneously polymerizing a mixture of predominantly homo-cis-polybutadiene, and homo-trans-polybutadiene, by polymerizing butadiene with a catalyst of: (a) an aluminum alkyl halide; (b) a hydrocarbon-soluble nickel or cobalt compound; (c) a hydrocarbon-soluble vanadium compound; and (d) an azo compound such as azo-benzene, the ratio of the cis-homopolymers to the trans-homopolymers being varied in accordance with the ratio of (b) to (c).

---

This invention relates to a process for the production of mixtures of high molecular weight cis- and trans-polybutadienes, wherein each molecule in the mixture is substantially entirely either cis or trans, and for the purposes of this invention, such molecules will be defined as cis-homo- or trans-homo polymers, respectively.

It is known to polymerize butadiene with mixed catalysts of alkyl aluminum halogenides and compounds of cobalt to obtain high-molecular 1,4-polybutadienes having over a 95% content of cis-double bonds. The vulcanized products produced therefrom posses good elasticity, low hysteresis, and a high resistance to abrasion, but on the other hand exhibit a poor tear resistance (by slit test according to Pohle).

It is also known to polymerize butadiene with mixed catalysts of alkyl aluminum halogenides and compounds of vanadium to obtain highly crystalline polybutadienes with a predominant content of trans-double bonds. Further in this connection, it has already been proposed to produce pure 1,4-trans-polybutadienes, which are not cross-linked and are soluble in aromatic hydrocarbons, by the polymerization of butadiene with a mixed catalyst of alkyl aluminum sesquichloride or alkyl aluminum monochloride, respectively, and halogen-free vanadium compounds which are soluble in diluents, for example, vanadium (III)-acetyl acetonate. These highly crystalline 1,4-trans-polybutadienes have plastomeric properties, possess a high tensile strength, a high notch impact strength (tear resistance by slit test), and are resistant to aging even in unstabilized condition when exposed to the atmosphere.

The polymers described in the last two paragraphs are those with a predominant content of cis- or trans-double bonds and thus are polymers whose properties are determined by the respective content of only cis- or only trans-double bonds.

Finally, it is known to polymerize butadiene with mixed catalysts of alkyl aluminum halogenides and compounds of titanium, for example the halogenides of titanium, to obtain high-molecular 1,4-polybutadienes. Depending upon the titanium halogenide utilized and the aluminum/titanium proportion used, there are obtained polymers having 1,4-cis-proportions of between approximately 60 and about 95%. In these polymers, the cis- and the trans-double bonds are distributed along the polymer chain in a predominantly statistical manner. If these polybutadienes are subjected to a fractionation according to solubility, there occurs not only a separation according to the molecular weight, but there is also observed a partial division according to the 1,4-cis and the 1,4-trans proportion, respectively. In the soluble fractions, there is a higher portion of polymers having a richer proportion of 1,4-cis with respect to the total polymer; conversely, in the fractions of low solubility, the polymers having higher 1,4-trans proportions are present. A separation into pure 1,4-cis and pure 1,4-trans polymers, however, is not found.

Accordingly, these polymers can be called statistical copolymers with respect to the structure of their double bonds. According to this characteristic structure, the realm of properties of these polymers which determines their fields of application is different from that of the 1,4-polybutadienes mentioned previously, which 1,4-polybutadienes are homopolymeric with respect to the structure of their double bonds. Thus, in any of the prior art polymerization processes, the resultant polymer was either predominantly cis or trans, or the polymer contained both cis and trans to a substantial extent in a statistical distribution in each molecule.

An object of this invention, therefore, is to provide a process for the polymerization of a mixture of cis-homo- and trans-homo-1,4-polybutadienes.

Another object is to provide novel catalytic compositions.

Upon further study of the specification and claims, other objects and advantages of the present invention will become apparent.

To attain these objects, there is provided a process for the production of mixtures of high molecular weight 1,4-cis-homo- and 1,4-trans-homo-polybutadienes, these mixtures being particularly valuable in many fields of use. This is done by the polymerization of butadiene in the presence of mixed catalysts of organoaluminum compounds and compounds of vanadium, nickel, and cobalt, the catalyst composition consisting essentially of the following:

(1) Organometal halide of aluminum of the formula $Al(R)_n X_{(3-n)}$, wherein R represents alkyl-, alkyl-aryl, and aryl-groups, the number of carbon atoms in R being on the order of 1–12 carbon atoms; X represents halogen; and $n$ is a number between 1 and 2 inclusive;

(2) A hydrocarbon-soluble compound of vanadium; and (3) A hydrocarbon-soluble compound of cobalt or nickel.

By "hydrocarbon-soluble" is meant a compound which dissolves to the extent of at least 1 milligram per liter of hydrocarbons at 0° C.

Preferred organometal halides are alkyl aluminum halogenides, particularly alkyl aluminum sesquihalogenides and dialkyl aluminum monohalogenides, the halogen being chlorine, bromine, or iodine. Most advantageous sesquichlorides are, for example, methyl, ethyl, propyl, n-butyl, isobutyl, n-octyl, 2-alkyl-hexyl, and dodecyl aluminum sesquichloride. Aside from alkyl aluminum sesquichlorides, there can be used aryl aluminum sesquichlorides, such as phenyl aluminum sesquichloride, and alkylaryl aluminum sesquichlorides, such as methyl-phenyl-, ethyl-phenyl- and dimethyl-phenyl-aluminium-sesquichlorides.

Furthermore, it is also possible to use mixtures of trialkyl, triaryl, or trialkylaryl aluminum compounds, dialkyl or dialkylaryl aluminum monohalogenides, on the one hand, and alkyl or alkylaryl aluminum dihalogenides and aluminum trihalides on the other hand, as long as the average number of the halogen atoms per aluminum atom is within the limits between 1 and 2 inclusive. (With respect to specific examples of alkyl, aryl, and alkylaryl moieties, reference is directed to the previous paragraph.)

Aluminum hydrides are also usable in mixture with the above-mentioned halogen-containing alkyl aluminum compounds, these aluminum hydrides being, for example, in the form of lithium aluminum hydride or sodium aluminum hydride. Finally, it is also possible to use aluminum hydride halogenides or their etherates, for example aluminum-hydride-chloride-etherate by itself or in mixture with the above-named aluminum compounds.

Cobalt, nickel, and vanadium compounds which can be used in connection with the present process are such compounds which are soluble in the aromatic or aliphatic diluents or solvents, respectively, which are employed. For example, there can be mentioned in this connection the cobalt, nickel, and vanadium salts of the fatty acids, such as cobalt, nickel, and vanadium acetate, butyrate, stearate, octoate, and naphthenate. Eminently suitable are complex compounds, such as the acetyl acetonates, for example, cobalt (II)- and -(III)-, nickel (II)-, and vanadium (III)-acetyl acetonate, the corresponding benzoyl acetonates, and the cyclopentadienyl and indenyl compounds of cobalt, nickel, and vanadium.

In addition thereto, it is also possible to employ the inorganic salts of cobalt, nickel, and vanadium which are themselves insoluble in hydrocarbons, such as the halogenides, for example, if they have been rendered soluble beforehand so that they can be dissolved in the used diluents or solvents. This is done by the addition of primary, secondary, or tertiary aliphatic and aromatic, saturated as well as unsaturated alcohols, such as, for example, butyl alcohol, benzyl alcohol, allyl alcohol, furfuryl alcohol; primary, secondary, or tertiary amines, such as, for example, butyl amine, aniline, benzylamine, pyridine; and ethers, such as, for example, dialkyl ether, diphenyl ether, anisole, dioxane, tetrahydrofuran, and furan. The function of the non-metallic portion of these compounds is merely to permit the solution of the metallic portion.

Likewise usable are the liquid compounds of cobalt, nickel, and vanadium which are miscible with hydrocarbons, such as, for example, vanadium (V) oxychloride and cobalt (II) nitrosyl chloride (Co(NOCl)$_2$). Here, too, it is recommended to add the above-mentioned compounds which are solubilizing intermediaries.

Inert diluents or solvents, respectively, which are suitable are aliphatic, cycloaliphatic, and aromatic hydrocarbons, such as, for example, butane, pentane, hexane, cyclohexane, isopropyl cyclohexane, benzine fractions having boiling points of about 50° C. to about 250° C., benzene and toluene, as well as chlorinated hydrocarbons, for example tetrachlorethylene and chlorobenzene. Mixtures of these hydrocarbons can also be employed.

The inert diluents or solvents respectively, are used in a quantity by weight, which is 1- to 100-fold, suitably 5- to 20-fold, and preferably about 10-fold the quantity of butadiene.

The aluminum compound is employed in quantities of 0.1 to 0.0001, preferably 0.02 to 0.002 mol, referred to 1 mol of butadiene. The mol ratio of any of the cobalt, nickel, and vanadium compounds used with respect to the organoaluminum compounds is to be 1:1 to 0.0004:1, preferably 0.2:1 to 0.002:1.

By changing the cobalt or nickel/vanadium mol ratio in the mixed catalysts, the proportion of cis- and trans-configuration in the polymer mixture and thus the properties of the vulcanized products manufactured therefrom can be varied within wide limits. Thus, it is easily possible to product polybutadiene mixtures of high molecular weight 1,4-cis- and 1,4-trans-polybutadiene with 95% cis-double bonds down to such polybutadienes having 5% cis-double bonds. These polybutadiene mixtures can be obtained by varying the vanadium/cobalt or vanadium/nickel mol ratio of the catalyst system within the limits of 40:1 to 0.01:1, preferably 10:1 to 0.1:1. Particularly interesting with respect to their technical applicability are polybutadiene mixtures containing 2 to 25% of the pure 1,4-trans-polybutadiene.

A further advantageous embodiment of the present process resides in the fact that it is possible to substantially accelerate the vanadium-initiated polymerization of the butadiene to polymers with double bonds of the trans-configuration, by modifying the catalyst system with azo and/or hydrazo compounds, of the formulas

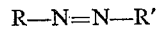

and

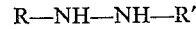

In this manner, in the presence of, for example, azobenzene, a lower vanadium/cobalt mol ratio can be employed. In the presence of azo compounds, for example azo-benzene, the vanadium/cobalt or vanadium/nickel mol ratio can be between 3:1 to 0.001:1, preferably 0.75:1 to 0.02:1. Above the vanadium/cobalt or vanadium/nickel proportion of 1:1, there are obtained in the presence of azo compounds, 1,4-polybutadiene mixtures having a proportion of more than 80% of the trans-configuration.

The amount of the modifying azo or hydrazo compound is 0.5 to 0.0001, preferably 0.1 to 0.005 mol per 1 mol of the organoaluminum compound.

With respect to the aforementioned azo and hydrazo compounds, R and R' are organic radicals. Preferably, R and R' represent alkyl of preferably 1–12 carbon atoms, phenyl, or naphthyl groups which can be substituted by halogen, lower alkyl of preferably 1–6 carbon atoms, alkoxy of preferably 1–6 carbon atoms, hydroxy, aryl of preferably 6–20 carbon atoms, or aryloxy groups of preferably 6–20 carbon atoms. Particularly preferred azo compounds are for example azobenzene, azotoluenes, chlorazo-benzenes, methoxy-azobenzenes, diphenyl-azobenzenes, naphthalene-azobenzenes, azoanisoles, phenyl-azostilbenes, azo-[bis(diphenyl)], azo-[bis-(diphenyl-ether)], azo-[bis-(naphthalene)], azo-[bis-(phenanthrene)], azo-[di-(isobutyric acid nitrile)] and azo-dicarboxylic esters.

It is likewise possible to use, in addition to the already mentioned azo compounds, other compounds which yield azo compounds under the reaction conditions. Thus, for example, azobenzene or substituted azobenzenes are produced from any of azoxybenzene, substituted azoxybenzenes, nitrosobenzene and substituted nitrosobenzenes, the latter compounds being reacted wtih organometallic compounds. In this way, the azobenzene and substituted benzene are formed from these precursors and the catalyst composition of the present invention.

Likewise suitable for modifying the vanadium-containing catalyst are arylhydrazo compounds, such as hydrazobenzene, chlorohydrazobenzene, hydrazotoluenes, ethyl-hydrazobenzenes, methoxy-hydrazobenzenes, diphenyl-hydrazobenzenes, phenyl - hydrazobenzenes, hydrazo-anisoles, phenyl-hydrazostilbenes; and furthermore compounds such as N,N'-diaryl-N,N'-dialkyl-hydrazo compounds wherein the aryl group contains from 6 to 20 carbon atoms, and the alkyl group from 1 to 6 carbon atoms, and wherein the hydrogen atoms are substituted partially or wholly by alkyl groups, such as, for example, methyl, ethyl, propyl, or isopropyl. Further suitable hydrazo compounds are triphenyl-hydrazine, tetraphenyl-hydrazine, N-naphthyl-N,N'-diphenyl-hydrazine, N,N'-diphenyl-N,N'-diethylhydrazine.

Further it is possible to employ for modifying the inventive catalyst system five- and si.:-membered aromatic ring systems containing the —N=N— grouping and their derivatives for example, 1,2,4,5-tetrazole, 1,2,4-triazine, 1,2,3-triazoline, 1,2,3-triazole, and tetrazole, and likewise cyclic aryl-azo compounds, such as benzocinnoline of the formula

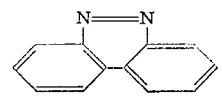

and their substituted derivatives; furthermore, bis-azo compounds, for example of the formula

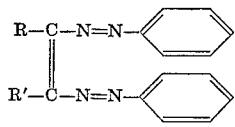

wherein R and R' may be hydrogen, an alkyl- and an aryl-group. Furthermore compounds of the formula

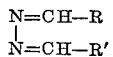

may be used, wherein R and R' are for instance phenyl-, naphthyl-, biphenyl- and phenanthrenyl-group, for example benzaldazine (R and R' are phenyl) and

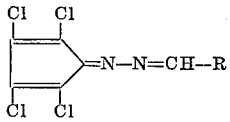

wherein R being phenyl-, biphenyl-, naphthyl- and a phenanthrenyl-group.

The polymerization is suitably conducted at temperatures between −30° and +100° C., preferably between 0° and +50° C., and particularly suitably at room temperature.

The polymerization can be carried out without pressure, as well as at subatmospheric or superatmospheric pressures. Generally, a pressure higher than atmospheric pressure is not necessary. The polymerization can be conducted discontinuously as well as continuously.

The molecular weights are influenced by the catalyst concentration, by the aluminum/vanadium-cobalt, or aluminum/vanadium/nickel mol ratio, by the polymerization temperature, and by the type of diluent. Thus, diluent mixtures of aliphatic and aromatic hydrocarbons yield lower average molecular weights and RSV values (reduced specific viscosity) than the pure hydrocarbons.

Still further, the purity of the butadiene employed also influences the average molecular weight of the polymers. If the butadiene-(1,3) starting material still contains acetylenes or allenes, such as, for example, butyne-(1), butyne-(2), propadiene, and butadiene-(1,2), an increasing concentration of these compounds causes decreasing average molecular weights. It is also possible to add these substances to the initial butadiene in order to regulate the molecular weights, if desired. For this purpose, acetylenes can also be used which are not usually contained in the technical butadiene, such as phenyl acetylenes or diacetylenes. Regulating substances can further be esters or nitriles, such as, for example, acetoacetic acid esters, acryl nitrile, acetonitrile, likewise alkyl halogenides or alkenyl halogenides, such as vinyl chloride or allyl chloride. These regulating compounds may be present only in small concentrations of about 0.02 to about 0.2 mol percent, based on one mol butadiene, because otherwise they inhibit the catalyst system and thus would lead to poor yields.

The working up of the reaction solutions is conducted in a conventional manner, in that the catalyst system is decomposed wtih the aid of alcohols, ketones, or complex-forming substances and the diluent is driven off by means of steam. Subsequently, the catalyst residues can be removed by washing the polymer with aqueous dispersions of ion exchange resins, or alcohols, such as, for example, methanol, to which are added, if desired, bases, acids, or complex-forming substances. The polymer can also be precipitated from the reaction solution with alcohols or ketones, for example methanol or acetone, and then stirred out of the solution with methanol or water for removing the catalyst residues. The polybutadiene mixture is finally dried under nitrogen in vacuum.

According to the present method, polybutadiene mixtures can be produced whose vulcanized products exhibit increased notch impact strength, hardness, and resistance to aging. Moreover, it becomes possible with this method to combine the properties inherent in the 1,4-homo-cis- and the 1,4-homo-trans-polybutadiene, which properties are radically different from each other, and to vary same, by correspondingly choosing the reaction conditions, in a manner which is almost unlimited.

The process of this invention is characterized by being simpler and less expensive than the production of mixtures of 1,4-homo-cis- and 1,4-homo-trans-polybutadiene wherein each type of butadiene is produced separately. This is particularly the case because the production of 1,4-homo-trans-polybutadiene is more expensive due to its poor solubility. When in mixture with 1,4-homo-cis-polybutadiene, however, it is substantially more soluble, so that it is generally possible to process the polymeric solutions of the claimed polymer mixtures in the same easy and simple manner as the polymer solutions of 1,4-homo-cis-polybutadiene.

In accordance with the present process, any type of cis-/trans-1,4-polybutadiene mixtures can be produced in a single plant during one polymerization. The separate production of 1,4-trans- and 1,4-cis-polybutadiene, in contradistinction thereto, requires two separate plants and, moreover, two different processes and thus substantially increases the investment costs, labor costs, and technological problems.

Aside from the disadvantage inherent in double plants, a disadvantage of mixing the benzenic polymer solutions of 1,4-cis-polybutadiene and 1,4-trans-polybutadiene produced in separate plants is that pure 1,4-trans-polybutadiene partially precipitates in crystalline form from its solutions. This crystalline 1,4-trans-polybutadiene can be redissolved only in aromatics at temperatures above 80° C. If, instead of mixing benzenic solutions, the separately polymerized and separately worked-up polymers are mixed on a mill, the disadvantages in this case are, inter alia, that two separate working-up processes (from solution to solid) have to be additionally provided, and that the milling itself represents a further expensive operating step.

A still further advantage of the present invention is that substantial savings in the relatively expensive vanadium compound are obtained by activating the catalysts with easily accessible, i.e., inexpensive, azo- and/or hydrazo-compounds. The modified mixed catalyst exhibits a longer lifetime and a higher activity.

The use of the thus-produced polybutadiene mixture depends on the contents of cis- or trans-configurations. Polymer mixtures with a high proportion of trans-configuration (80%) are non-elastomeric thermoplastic materials. They can be vulcanized to valuable products, being particularly suitable, for example, for the manufacture of tread mixtures for tires, shoe sole material, floor coverings, rubber seals such as washers, and foam rubbers.

Polybutadiene mixtures having a low proportion, 5 to 25%, of trans-configuration have predominantly elastomeric properties. Vulcanized products made therefrom are distinguished by a notch impact strength (according to Pohle) which is higher by 100% and more, a higher tensile strength, and a greater resistance to aging than the pure 1,4-homo-cis-polybutadiene vulcanized products.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

Example 1

Under the exclusion of atmospheric oxygen and moisture, 1000 ml. benzene are provided in a nitrogen-purged agitated flask of 2 liters capacity at room temperature; thereafter, there are added successively 20 ml. of a benzenic solution of vanadium (III)-/cobalt (III)-acetyl acetonate having 0.058 millimol vanadium (III)-acetyl acetonate (2.96 mg. vanadium) and 0.116 millimol cobalt (III)-acetyl acetonate (6.84 mg. cobalt), (cobalt/vanadium molar proportion 1:05), and 2.48 g. (20 millimols) ethyl aluminum sesquichloride. Thereupon, there are finally added, all at once, 100 g. (1.85 mol) butadiene in liquid form. The polymerization temperature is kept at 30° C.

After 6 hours, the catalyst is inactivated by the addition of 20 ml. acetone; and then the polybutadiene is precipitated from the reaction solution by methanol and finally washed twice with 500 ml. portions of methanol for removing the catalyst residues. The polymer is suction filtered and dried in a vacuum drying chamber under a nitrogen atmosphere at 40° C.

There are obtained 95 g. (95% of theory) of a polybutadiene which, according to the IR-analysis, has 97% centrally positioned cis-double bonds, 2% centrally positioned trans-double bonds, and less than 1% vinyl double bonds. The RSV value (reduced specific viscosity) is 1.8 (measured at 0.1 g. in 100 ml. toluene at 27° C.). The gel content is less than 1%, and the Mooney value (ML–4) amounts to 24. The polybutadiene is a 1,4-cis-polybutadiene; the 1,4-trans-polybutadiene content is about 1%.

Example 2

Butadiene is polymerized as in Example 1, except that the polymerization is carried out without vanadium (III)-acetyl acetonate, i.e., with 0.116 millimol cobalt (III)-acetyl acetonate (6.84 mg. cobalt). The resulting polymer contains 88 g. (88% of theory) of a 1,4-cis-polybutadiene which, according to the IR-analysis, possesses 98% centrally positioned cis-double bonds, 1% centrally positioned trans-double bonds, and less than 1% vinyl double bonds. The RSV value is 1.8 (measured at 0.1 g. in 100 ml. toluene at 27° C.). The gel content is less than 1%. The Mooney value (ML–4) is 26.

Examples 3–8

In Table 1, the results of a series of tests are tabulated wherein the test conditions related in Example 1 are maintained and only the cobalt and vanadium concentrations and thus the vanadium/cobalt proportions are varied. Examples 1 and 2 are cited for purposes of comparison.

The content of high-molecular 1,4-trans-polybutadiene in the polybutadiene mixture thus corresponds to the portion which is insoluble in toluene at 27° C., minus the genuine gel which is insoluble at 80° C. in p-xylene. This substantially coincides with the 1,4-trans-polybutadiene content determinable from the increased trans-double bond content.

Example 9

Under the exclusion of atmospheric oxygen and moisture, 4000 ml. benzene are introduced at ambient temperature into a nitrogen-purged stirred flask of 6 liters capacity. Then, there are added successively 80 ml. of a benzenic solution of vanadium (III)-/cobalt (III)-acetyl acetonate having 0.03 millimol vanadium (III)-acetyl acetonate (15.3 mg. vanadium) and 0.03 millimol cobalt (III)-acetyl acetonate (17.7 mg. cobalt), (cobalt/vanadium molar proportion 1:1), and 9.92 g. (80 millimol) ethyl aluminum sesquichloride. Thereupon, 400 g. (7.4 mol) butadiene are added at once in liquid form. The polymerization temperature is maintained at 30° C. for 5 hours.

By the addition of 80 ml. acetone, the catalyst is inactivated; then, the polybutadiene is precipitated from the reaction solution by methanol and is finally stirred twice with 1000 ml. portions of methanol for removing the catalyst residues. The polymer is vacuum-filtered and dried in a vacuum drying chamber under a nitrogen atmosphere at 40° C.

Yield: 297 g. (74.2% of theory) polybutadiene. According to the IR-analysis, 89% of the double bonds are centrally positioned cis-double bonds and 8% are centrally positioned trans-double bonds. The content of vinyl double bonds is of the order of 3%. The RSV value is 5.0 (measured as the soluble matter of 0.1 g. in 100 ml. toluene at 27° C.) or 4.4 (measured as the soluble matter of 0.1 g. in 100 ml. p-xylene at 80° C.). The insoluble, crystalline portions amount to 9% at 27° C. in toluene; no gel is observed which is insoluble at 80° C. in p-xylene (0%). Thus, approximately 7% (according to the IR-analysis) to 9% (matter insoluble in toluene at 27° C.) of 1,4-trans-polybutadiene is mixed in with the 1,4-cis-polybutadiene.

Examples 10–19

The following examples prove the activating influence

TABLE 1

| Ex. | Acetyl Acetonate of— | | Cobalt/ Vanadium, Molar Ratio | Duration of Polymerization, hours | Yield in percent | RSV | Insoluble Matter in percent at— | | Mooney ML–4 | Content of Double Bonds in percent | | | Percentage of 1,4-trans-polybutadiene in the mixture | |
|---|---|---|---|---|---|---|---|---|---|---|---|---|---|---|
| | Vanadium (III) mMol | Cobalt (III) mMol | | | | | 27° C. (²) | 80° C. (²) | | Cis- | Trans- | Vinyl- | (³) | (⁴) |
| 2 | | 0.116 | | 6 | 88 | 1.8 | 1 | | 26 | 98 | 1 | 1 | 0 | 0 |
| 1 | 0.058 | 0.116 | 1:0.5 | 6 | 95 | 1.8 | 1 | 0 | 24 | 97 | 2 | 1 | 1 | 1 |
| 3 | 0.11 | 0.165 | 1:0.66 | 6 | 85 | 2.3 | 5 | 0 | 52 | 94 | 5 | 1 | 4 | 5 |
| 4 | 0.25 | 0.20 | 1:1.25 | 6 | 89 | 1.9 | 6 | 1 | 27 | 92 | 6 | 2 | 5 | 5 |
| 5 | 0.20 | 0.10 | 1:2 | 6 | 94 | 1.8 | 8 | 0 | 42 | 89 | 10 | 1 | 9 | 8 |
| 6 | 0.36 | 0.15 | 1:2.4 | 6 | 85 | 1.8 | 11 | 1 | 48 | 87 | 12 | 1 | 11 | 10 |
| 7 | 0.36 | 0.10 | 1:3.6 | 6 | 55 | 1.8 | 22 | 2 | 67 | 77 | 22 | 1 | 21 | 20 |
| 8 | 1.05 | 0.15 | 1:7 | 6 | 80 | 2.0 | 35 | 1 | 80 | 63 | 36 | 1 | 35 | 34 |

¹ RSV, measured with respect to the soluble proportion of 0.1 g. in 100 ml. toluene at 27° C.  ² Insoluble matter (gel) of 0.1 g. in 100 ml. toluene at 27° C., or of 0.1 g. in 100 ml. p-xylene at 80° C.  ³ 1,4-trans-polybutadiene content of the polybutadiene mixture from the trans-double bond content (IR-analysis).  ⁴ 1,4-trans-polybutadiene content of the polybutadiene mixture equal to the matter which is insoluble in toluene at 27° C., less the insoluble, genuine gel which is insoluble in p-xylene at 80° C.

Table 1 shows that the trans-polymerization of butadiene triggered by vanadium (III)-acetyl acetonate takes place substantially more slowly than the cis-polymerization triggered by cobalt (III)-acetyl acetonate. Only at a cobalt/vanadium proportion of 1:>0.5 does the presence of vanadium (III)-acetyl acetonate in the mixed catalyst become noticeable by the increased content of trans-double bonds determined from the IR-spectrum.

High molecular weight, crystalline 1,4-trans-polybutadiene is insoluble in toluene at 27° C., but is soluble at 80° C. (in p-xylene). The portion which is insoluble at 80° C. in p-xylene is genuine gel.

exerted by the azo-benzene on the vanadium-containing portion of the Ziegler mixed catalyst.

The polymerization in all the examples is conducted under the following conditions, except that the catalyst composition is changed in each example.

Under the exclusion of atmospheric oxygen and moisture, 1000 ml. benzene are provided in a nitrogen-purged stirred flask of 2 liters capacity; then, at room temperature, 20 ml. of a benzenic solution of vanadium (III)-/cobalt (III)-acetyl acetonate with 0.1 millimol vanadium (III)-acetyl acetonate (5.1 mg. vanadium) and 0.1 millimol cobalt acetyl acetone (5.9 mg. cobalt), (cobalt/vanadium molar proportion 1:1), and 2.48 g. (20 millimol) ethyl aluminum sesquichloride are successively added; and finally 108 g. (2 mols) butadiene are added at once, in liquid form. The polymerization temperature is kept at 25° C.

The polymerization is stopped, by destroying the catalyst by means of 20 ml. methanol, at the moment at which the viscosity of the reaction mixture has increased to such an extent that the stirrer is arrested. The polybutadiene is then precipitated from the reaction solution by the further addition of methanol, and is finally stirred twice with 500 ml. portions of isopropyl alcohol for removing the catalyst residues. The polymer is vacuum-filtered and dried in a vacuum drying chamber under a nitrogen atmosphere at 40° C.

There are obtained 81 g. (75% of theory) of a polybutadiene which, according to the IR-analysis, possesses 88% centrally positioned cis-double bonds, 11% centrally positioned trans-double bonds, and 1% vinyl double bonds. The RSV value is 5.2 (measured as the soluble matter of 0.1 g. in 100 ml. toluene at 27° C.), or 4.6 (measured as the soluble matter of 0.1 g. in 100 ml. p-xylene at 80° C.). The insoluble crystalline proportion amounts to 12% at 27° C. in toluene; at 80° C. in p-xylene, no genuine gel is observed (0%). Consequently, there are mixed in with the 1,4-cis-polybutadiene 10% (IR-analysis) or 12% (insoluble matter in toluene at 27° C.) of 1,4-trans-polybutadiene.

The following Table 2 presents the results of Examples 10–19.

in a vacuum drying chamber at 40° C. in a nitrogen atmosphere.

There are obtained 78 g. (78% of theory) of a polybutadiene which, according to the IR-analysis, possesses 85% centrally positioned cis-double bonds, 11% centrally positioned trans-double bonds, and 2% vinyl double bonds.

The RSV value (measured as the soluble matter of 0.1 portions amount, in toluene at 27° C., to 9%, in p-xylene at 80° C. to 1%. The polybutadiene mixture thus contains 10% (according to the IR-analysis) or 9% (according to the insoluble matter in toluene at 27° C., less the genuine gel) of 1,4-trans-polybutadiene.

Example 21

The polymerization process is carried out under the conditions set forth in Example 20, in the presence of 1 millimol azo-benzene.

There are obtained 84 g. (84% of theory) of a polybutadiene which, according to the IR-analysis, has 53% centrally positioned cis-double bonds, 45% centrally positioned trans-double bonds, and 2% vinyl double bonds. The RSV value amounts to 0.9 (measured as the soluble matter of 0.1 g. in 100 ml. toluene at 27° C.) or 1.1 (measured as the soluble matter of 0.1 g. in 100 ml. p-xylene at 80° C.). The insoluble proportions are, in toluene at 27° C.: 44%; in p-xylene at 80° C.: 4%.

Consequently, the polybutadiene mixture contains 40% 1,4-trans-polybutadiene (in correspondence with the in-

TABLE 2

| Ex. | Acetyl Acetonate of— | | Cobalt/Vanadium, Molar Ratio | Azobenzene, mMol | Polymerization Time, hours | Yield in percent | Insoluble Matter in percent at— | | RSV at— | | Double Bonds in percent | | | Percentage of 1,4-trans-polybutadiene in the mixture | |
|---|---|---|---|---|---|---|---|---|---|---|---|---|---|---|---|
| | Vanadium (III) mMol | Cobalt (III) mMol | | | | | 27° C. (2) | 80° C. (2) | 27° C. (3) | 80° C. (3) | Cis- | Trans- | Vinyl- | (4) | (5) |
| 10 | 0.1 | 0.1 | 1:1 | ---- | 0.5 | 70 | 12 | 0 | 5.2 | 4.9 | 88 | 11 | 1 | 10 | 12 |
| 11 | 0.1 | 0.1 | 1:1 | 1 | 0.5 | 65 | 95 | 3 | (1) | 3.8 | ---- | 100 | ---- | 100 | 95 |
| 12 | 0.05 | 0.05 | 1:1 | ---- | 1.5 | 62 | 5 | 1 | 6.5 | 5.8 | 93 | 6 | 1 | 5 | 4 |
| 13 | 0.05 | 0.05 | 1:1 | 1 | 0.75 | 67 | 86 | 2 | (1) | 3.6 | 11 | 89 | ---- | 88 | 84 |
| 14 | 0.075 | 0.025 | 3:1 | ---- | 1.5 | 63 | 5 | 1 | 7.2 | 6.5 | 95 | 4 | 1 | 3 | 4 |
| 15 | 0.075 | 0.025 | 3:1 | 1 | 1.5 | 68 | 51 | 2 | 4.4 | 5.2 | 50 | 49 | 1 | 48 | 49 |
| 16 | 0.09 | 0.01 | 9:1 | ---- | 0.5 | 87 | <1 | 0 | 4.6 | 4.4 | 98 | 1 | 1 | 0 | <1 |
| 17 | 0.09 | 0.01 | 9:1 | 1 | 0.5 | 91 | 16 | 0 | 2.8 | 2.7 | 82 | 17 | 1 | 16 | 16 |
| 18 | 0.045 | 0.005 | 9:1 | ---- | 3.33 | 84 | 1 | 0 | 3.4 | 3.3 | 98 | 1 | 1 | 0 | 1 |
| 19 | 0.045 | 0.005 | 9:1 | 1 | 3.33 | 86 | 21 | 1 | 2.8 | 2.9 | 79 | 20 | 1 | 19 | 20 |

[1] Undetermined. [2] Insoluble matter of 0.1 g. in 100 ml. toluene at 27° C. or in 100 ml. p-xylene at 80° C. [3] RSV value, determined from the soluble matter of 0.1 g. in 100 ml. toluene at 27° C., or from the soluble matter of 0.1 g. in 100 ml. p-xylene at 80° C. [4] 1,4-trans-polybutadiene content of the polybutadiene mixture from the trans-double bond content (IR-analysis). [5] 1,4-trans-polybutadiene content of the polybutadiene mixture equal to the matter insoluble in toluene at 27° C., less the genuine gel insoluble in p-xylene at 80° C.

Table 2 demonstrates that the presence of azobenzene during the polymerization strongly accelerates the formation of the 1,4-trans-polybutadiene. In addition to exerting an activating effect upon the vanadium-containing portion of the mixed catalyst, the azo-benzene also decreases the RSV value of the polymers.

Example 20

Under the exclusion of atmospheric oxygen and moisture, 1000 ml. benzene are introduced into a nitrogen-purged stirred flask of 2 liters capacity, at room temperature; thereupon, 20 ml. of a benzenic solution of vanadium (III)-/nickel (II)-acetyl acetonate with 0.05 millimol vanadium (III)-acetyl acetonate (2.55 mg. vanadium) and 0.05 millimol nickel (II)-acetyl acetonate (2.9 mg. nickel), (vanadium/nickel molar proportion 1:1), and 2.48 g. (20 millimols) ethyl aluminum sesquichloride are successively added; finally, 100 g. (1.85 mol) butadiene in liquid form are added at once. The polymerization temperature is kept at 25° C.

The catalyst is inactivated after 6 hours by the addition of 20 ml. methanol; and then the polybutadiene is precipitated from the reaction solution by the further addition of methanol and is finally stirred twice with 500 ml. portions of isopropyl alcohol in order to remove the catalyst residues. The polymer is vacuum-filtered and dried soluble matter in toluene at 27° C., less the genuine gel).

Example 22

Under the exclusion of atmospheric oxygen and moisture, 0.557 g. (1.6 millimol) vanadium (III)-acetyl acetonate and 9.92 g. (80 millimols) ethyl aluminum sesquichloride are introduced at room temperature into 4000 ml. benzene containing 35 p.p.m. water. The thus-produced solution of catalyst is then activated by adding dropwise 20 ml. of a benzenic solution of azobenzene containing 0.728 g. (4 millimols) azobenzene.

At a reaction temperature of 30° C., 216 g. (4 mols) butadiene in liquid form are added all at once to this solution. After 6 hours, the polymerization is terminated by the dropwise addition of 20 ml. of methanol. By the further addition of methanol, the 1,4-transpolybutadiene is precipitated from the benzenic reaction solution, and the precipitate is stirred twice with 500 ml. portions of isopropyl alcohol in order to remove the catalyst residues. The polymer is suction filtered and dried in a vacuum drying chamber under a nitrogen atmosphere at 40° C.

There are obtained 175 g. (80.6% of theory) of a polybutadiene which, according to IR-analysis, represents pure 1,4-trans-polybutadiene (100% trans-double bonds). The RSV value is 2.56, measured as the soluble portion of 0.1 g. in 100 ml. p-xylene at 80° C. The insoluble portion (gel) amounts to 1%, measured of 0.1 g. in 100 ml. p-xylene at 80° C. The melting point is 145° C. (according to theory: 148° C.).

The preceding examples can be repeated with similar success by substituting the generically and specifically described novel catalyst compositions of this invention for the catalyst compositions used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A process for the production of mixtures of high molecular weight 1,4-homo-cis- and 1,4-homo-transpolybutadienes, which process comprises polymerizing butadiene from the beginning to the end of the polymerization, in the presence of a catalyst composition consisting essentially of:

(A) alkyl aluminum halogenide of the formula $$Al(R)_nX_{(3-n)}$$

wherein R represents a member selected from the group consisting of alkyl-, alkylaryl-, and aryl-groups of 1 to 12 carbon atoms, X represents halogen, and $n$ represents a number between 1 and 2 inclusive;
(B) a hydrocarbon-soluble compound of vanadium;
(C) a hydrocarbon-soluble compound of a metal selected from the group consisting of cobalt and nickel; and
(D) a compound selected from the group consisting of azo and hydrazo compounds of the formula $$R-N=N-R'$$

and $$R-NH-NH-R',$$

respectively, wherein R and R' are selected from the group consisting of phenyl and naphthyl groups, and derivatives thereof,
the mol ratio of (A) to butadiene being 0:1:1 to 0.0001:1;
the mol ratio of (C) to (A) being 1:1 to 0.0004:1;
the mol ratio of (B) to (C) being 3:1 to 0.001:1, and the mol ratio of (D) to (A) being 0.5:1 to 0.0001:1.

2. A process as defined by claim 1 wherein the mol ratio of any of the cobalt or nickel compounds with respect to the organoaluminum compound is 0.2:1 to 0.002:1.

3. A process as defined by claim 1 wherein the organoaluminum compound is used in quantities of 0.02 to 0.002 mol, based on 1 mol of butadiene.

4. A process as defined by claim 1 wherein the mol ratio of vanadium to the metal selected from the group consisting of cobalt and nickel is 10:1 to 0.1:1.

5. A process as defined by claim 1 wherein the mol ratio of the additional compound with respect to the organoaluminum compound is 0.1:1 to 0.005:1.

6. A process for the production of mixtures of high molecular weight 1,4-homo-cis- and 1,4-homo-trans-polybutadienes, which process comprises polymerizating butadiene throughout the polymerization in the presence of a catalyst composition consisting essentially of:

(A) 0.1 to 0.0001 mol ethyl aluminum sesquichloride per mol of butadiene;
(B) cobalt acetyl acetonate in a molar ratio to (A) of 1:1 to 0.0004:1;
(C) vanadium acetyl acetonate in a molar ratio to (B) of 40:1 to 0.01:1; and
(D) azobenzene in a molar ratio to (A) of 0.5:1 to 0.0001:1.

7. A catalyst composition consiting essentially of the product obtained by mixing:

(A) 0.1 to 0.0001 mol ethyl aluminum sesquichloride;
(B) cobalt acetyl acetonate in a molar ratio to (A) of 1:1 to 0.0004:1;
(C) vanadium acetyl acetonate in a molar ratio to (B) of 0.75:1 to 0.02:1; and
(D) azobenzene in a molar ratio to (A) of 0.5:1 to 0.0001:1.

References Cited

UNITED STATES PATENTS 3,086,000   4/1963   Wargotz _____ 260—94.3

FOREIGN PATENTS 906,334   9/1962   Great Britain.

JOSEPH L. SCHOFER, *Primary Examiner.*

R. A. GAITHER, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,402,163 September 17, 1968

Bernhard Schleimer et al.

It is certified that error appears in the above identified patent and that said Letters Patent are hereby corrected as shown below:

Column 1, line 36, "posses" should read -- possess --. Column 3, line 67, "product" should read -- produce --. Column 4, line 68, "tetrazole" should read -- tetraaine --. Column 7, line 4, "1:05" should read -- 1:0.5 --. Columns 7 and 8, TABLE I, heading to the seventh column, line 1 thereof, "RSV" should read -- RSV[1] --. Column 10, line 7, after "0.1" insert -- g. in 100 ml. toluene at 25° C.) is 0.45. The insoluble --. Column 12, line 29, "consiting" should read -- consisting --.

Signed and sealed this 17th day of March 1970.

(SEAL)
Attest:

Edward M. Fletcher, Jr.  WILLIAM E. SCHUYLER, JR.
Attesting Officer  Commissioner of Patents